(12) United States Patent
Winarski

(10) Patent No.: US 10,224,068 B2
(45) Date of Patent: *Mar. 5, 2019

(54) MAGNETIC STORAGE MEDIA INCLUDING NANOTUBES CONTAINING MAGNETIC NANOPARTICLES

(71) Applicant: Gula Consulting Limited Liability Company, Dover, DE (US)

(72) Inventor: Tyson York Winarski, Mountain View, CA (US)

(73) Assignee: Gula Consulting Limited Liability Company, Wilmington, DE (US)

(*) Notice: Subject to any disclaimer, the term of this patent is extended or adjusted under 35 U.S.C. 154(b) by 364 days.

This patent is subject to a terminal disclaimer.

(21) Appl. No.: 15/009,463

(22) Filed: Jan. 28, 2016

(65) Prior Publication Data
US 2016/0155459 A1 Jun. 2, 2016

Related U.S. Application Data

(63) Continuation of application No. 14/171,699, filed on Feb. 3, 2014, now Pat. No. 9,251,822, which is a
(Continued)

(51) Int. Cl.
*G11B 5/65* (2006.01)
*G11B 5/706* (2006.01)
(Continued)

(52) U.S. Cl.
CPC ............... *G11B 5/65* (2013.01); *G11B 5/54* (2013.01); *G11B 5/706* (2013.01); *B82Y 10/00* (2013.01);
(Continued)

(58) Field of Classification Search
CPC .. G11B 5/65; G11B 5/54; G11B 5/706; B82Y 10/00; Y10S 977/742; Y10S 977/773
See application file for complete search history.

(56) References Cited

U.S. PATENT DOCUMENTS

| 4,333,985 A | 6/1982 | Shirahata et al. |
| 4,393,110 A | 7/1983 | Fukuda |

(Continued)

FOREIGN PATENT DOCUMENTS

| CN | 1670251 A | | 9/2005 |
| JP | 2005-056534 | * | 3/2005 |
| JP | 2005-56534 A | | 3/2005 |

OTHER PUBLICATIONS

English Machine Translation: Fujimoto (JP 2005-056534).*
(Continued)

*Primary Examiner* — Holly C Rickman
*Assistant Examiner* — Linda N Chau
(74) *Attorney, Agent, or Firm* — Christensen O'Connor Johnson Kindness PLLC

(57) ABSTRACT

A magnetic storage medium is formed of magnetic nanoparticles that are encapsulated within nanotubes, which are arranged in a substrate to facilitate the reading and writing of information by a read/write head. The substrate may be flexible or rigid. Information is stored on the magnetic nanoparticles via the read/write head of a storage device. These magnetic nanoparticles are arranged into data tracks to store information through encapsulation within the carbon nanotubes. As carbon nanotubes are bendable, the carbon nanotubes may be arranged on flexible or rigid substrates, such as a polymer tape or disk for flexible media, or a glass substrate for rigid disk. A polymer may assist holding the nanoparticle-filled carbon tubes to the substrate.

26 Claims, 5 Drawing Sheets

Nanotube with encapsulated magnetic nanoparticles

Related U.S. Application Data continuation of application No. 12/700,738, filed on Feb. 5, 2010, now Pat. No. 8,647,757, which is a continuation of application No. 11/278,879, filed on Apr. 6, 2006, now Pat. No. 7,687,160.

(51) Int. Cl.
    *G11B 5/54*      (2006.01)
    *B82Y 10/00*      (2011.01)

(52) U.S. Cl.
    CPC ........ *Y10S 977/742* (2013.01); *Y10S 977/773* (2013.01)

(56) References Cited

U.S. PATENT DOCUMENTS

| | | |
|---|---|---|
| 5,851,643 A | 12/1998 | Honda et al. |
| 6,324,032 B1 | 11/2001 | Ohtsuka et al. |
| 6,465,132 B1 | 10/2002 | Jin |
| 6,580,573 B1 | 6/2003 | Hull et al. |
| 6,835,330 B2 | 12/2004 | Nishino et al. |
| 6,865,044 B1 | 3/2005 | Albrecht et al. |
| 6,962,685 B2 | 11/2005 | Sun |
| 7,045,088 B2 | 5/2006 | Matsumiya et al. |
| 7,419,624 B1 | 9/2008 | Smalley et al. |
| 7,687,159 B2 | 3/2010 | Chen |
| 7,687,160 B2 | 3/2010 | Winarski |
| 7,695,769 B2 | 4/2010 | Watanabe et al. |
| 7,803,262 B2 | 9/2010 | Haik |
| 7,976,966 B2 | 7/2011 | Winarski |
| 8,213,119 B2 | 7/2012 | Jubert |
| 8,241,767 B2 | 8/2012 | Winarski |
| 8,243,390 B2 | 8/2012 | Jubert |
| 8,437,104 B2 | 5/2013 | Winarski |
| 8,507,032 B2 | 8/2013 | Winarski |
| 8,647,757 B2 | 2/2014 | Winarski |
| 8,817,422 B2 | 8/2014 | Winarski |
| 2003/0095356 A1 | 5/2003 | Nakayama et al. |
| 2003/0190278 A1 | 10/2003 | Wang et al. |
| 2003/0214742 A1 | 11/2003 | Kai et al. |
| 2004/0071951 A1 | 4/2004 | Jin |
| 2004/0106009 A1 | 6/2004 | Nakamura et al. |
| 2004/0127130 A1 | 7/2004 | Yi et al. |
| 2005/0058805 A1 | 3/2005 | Kimura et al. |
| 2005/0068679 A1 | 3/2005 | Chen |
| 2005/0079282 A1 | 4/2005 | Jin |
| 2005/0142385 A1 | 6/2005 | Jin |
| 2005/0170169 A1 | 8/2005 | Watanabe et al. |
| 2005/0214356 A1 | 9/2005 | Joyce |
| 2005/0249980 A1 | 11/2005 | Itoh et al. |
| 2005/0254168 A1 | 11/2005 | Inomata |
| 2006/0065136 A1 | 3/2006 | Takahashi et al. |
| 2006/0075418 A1 | 4/2006 | Kurt et al. |
| 2006/0099461 A1 | 5/2006 | Jones et al. |
| 2007/0054154 A1 | 3/2007 | Leu |
| 2007/0158610 A1* | 7/2007 | Hong ............... C09K 5/10 252/71 |
| 2007/0184969 A1 | 8/2007 | Dubois et al. |
| 2007/0224459 A1 | 9/2007 | Hsieh et al. |
| 2007/0237987 A1 | 10/2007 | Winarski |
| 2007/0243124 A1 | 10/2007 | Baughman et al. |
| 2007/0290384 A1 | 12/2007 | Kodas et al. |
| 2008/0014442 A1 | 1/2008 | Rida |
| 2008/0224100 A1* | 9/2008 | Smalley ............. B01J 19/081 252/510 |
| 2008/0260941 A1 | 10/2008 | Jin |
| 2009/0053512 A1 | 2/2009 | Pyun et al. |
| 2009/0202644 A1 | 8/2009 | Gogotsi et al. |
| 2009/0220561 A1 | 9/2009 | Jin et al. |
| 2009/0280242 A1 | 11/2009 | Winarski |
| 2010/0014187 A1 | 1/2010 | Winarski |
| 2010/0285336 A1 | 1/2010 | Winarski |
| 2010/0285337 A1 | 11/2010 | Winarski |
| 2010/0291412 A1 | 11/2010 | Winarski |
| 2013/0230743 A1 | 9/2013 | Winarski |

OTHER PUBLICATIONS

Abstract of Application No. CN 1670251A, filed Sep. 21, 2005, 1 page.
Tyagi, P.K., et al., "Preparation of Ni-Filled Carbon Nanotubes for Key Potential Applications in Nanotechnology," in A. Matthews (ed.), "Thin Solid Films: Proceedings of the 31st International Conference on Metallurgical Coatings and Thin Films, San Diego, Calif., Apr. 19-23, 2004," Elsevier, Amsterdam, vols. 469-470, pp. 127-130.

* cited by examiner

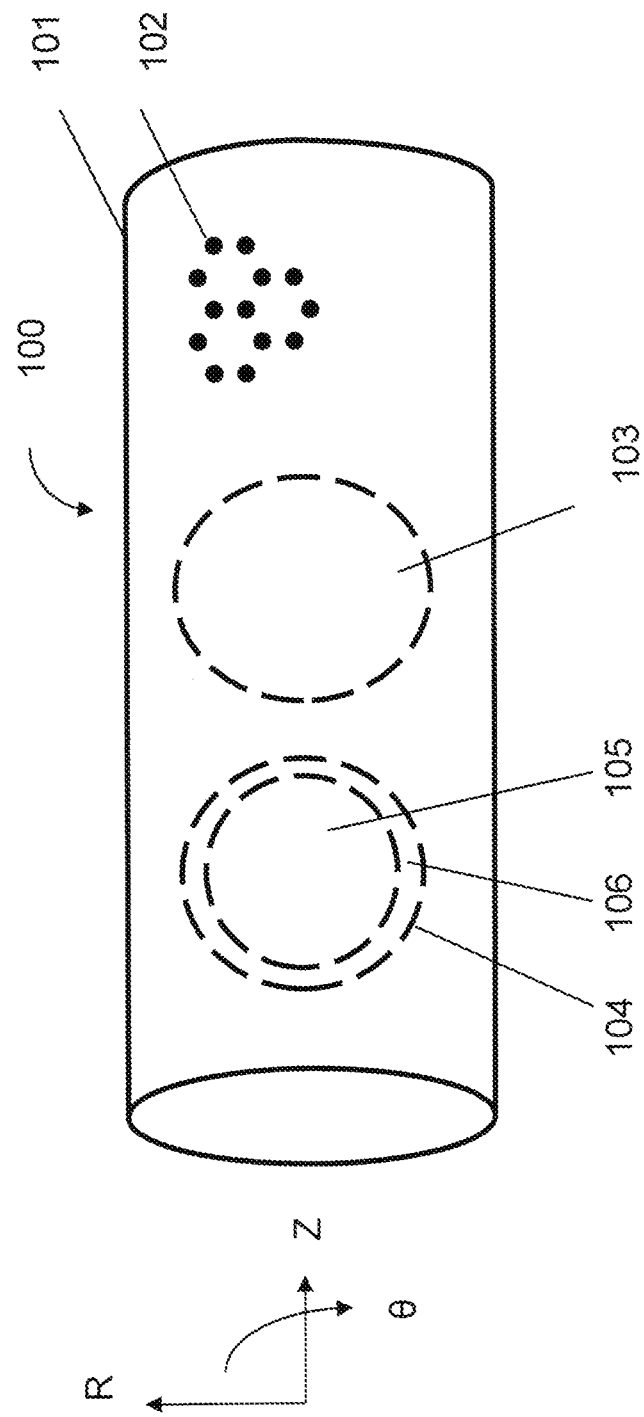
FIG. 1 – Nanotube with encapsulated magnetic nanoparticles

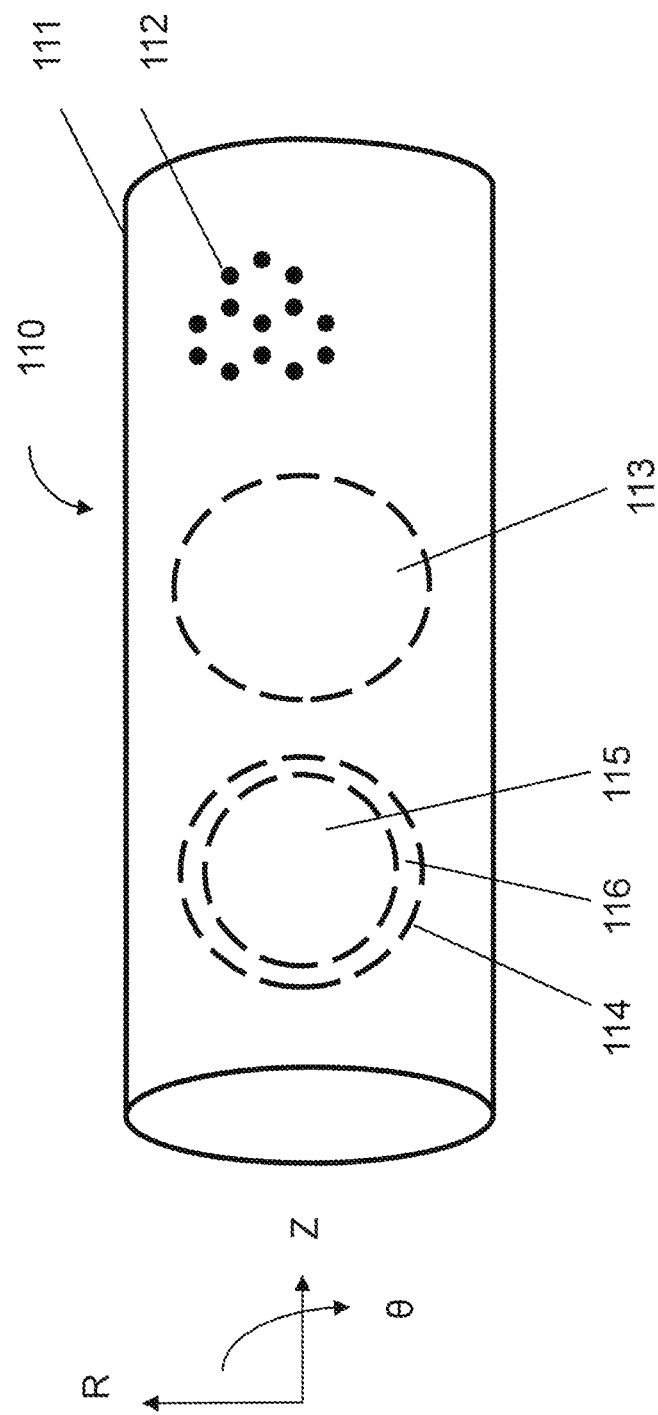
FIG. 2 – Nanotube with encapsulated magnetic-shunt nanoparticles

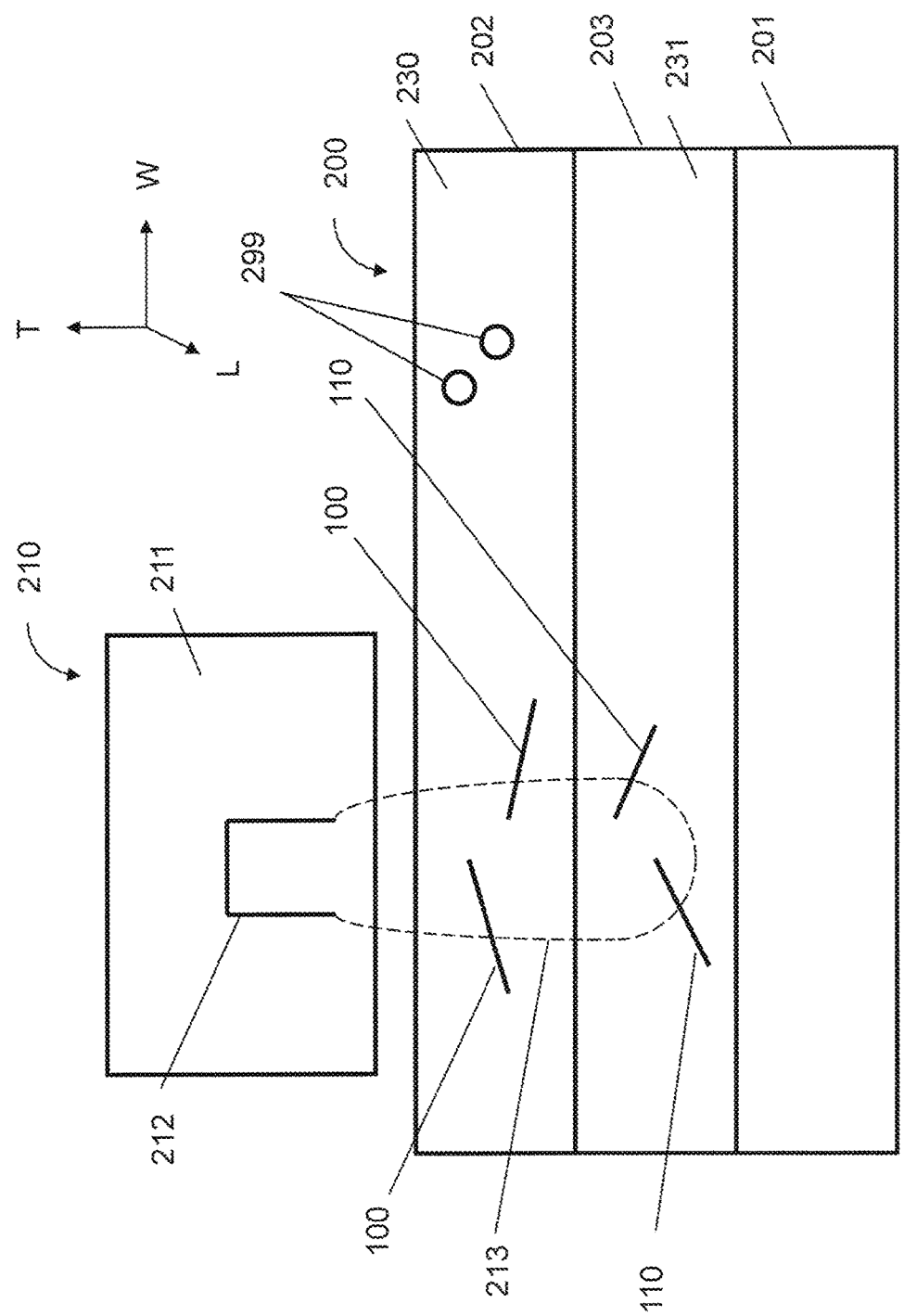
FIG. 3 – Cross-section of Magnetic Medium

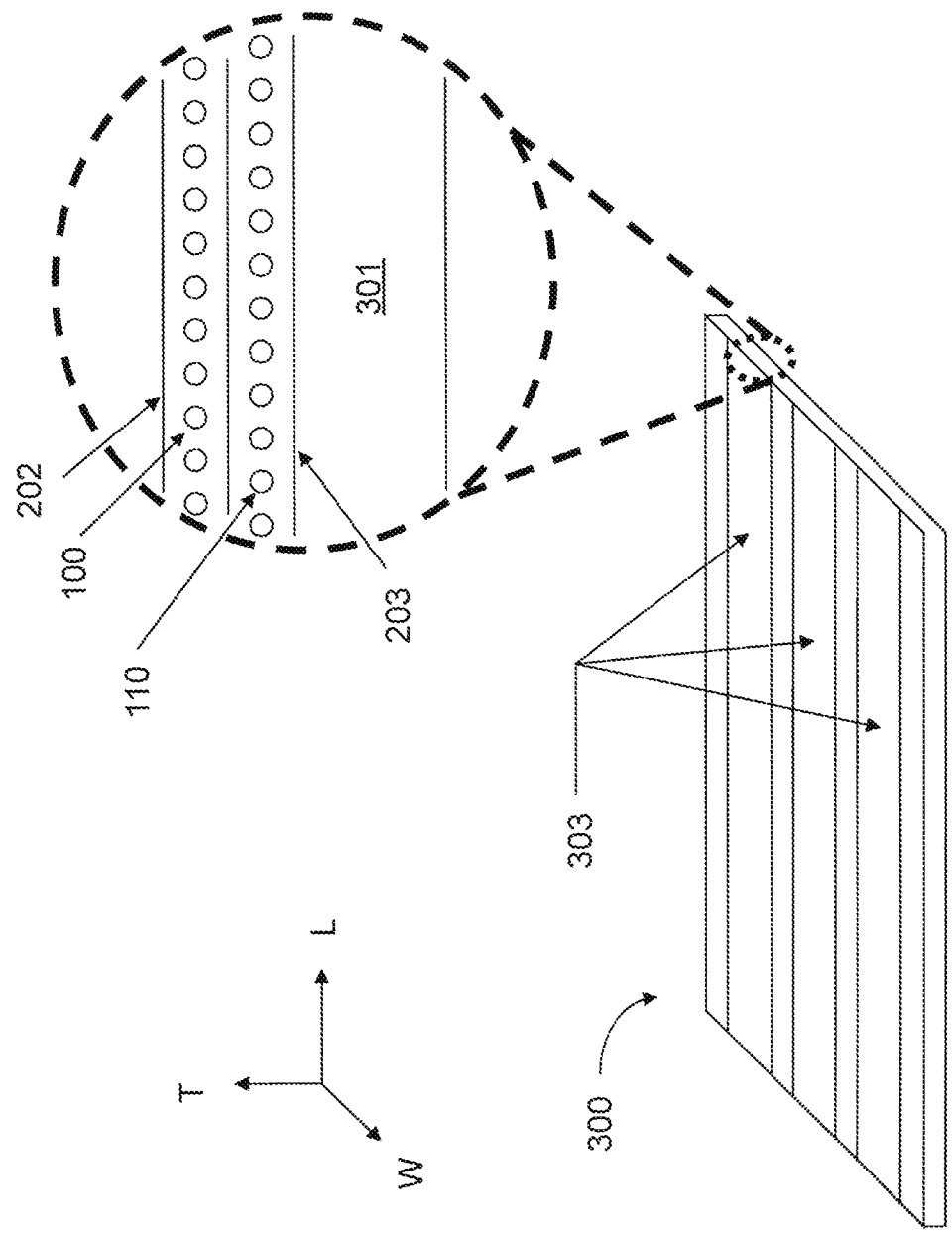
FIG. 4 View of Magnetic Tape

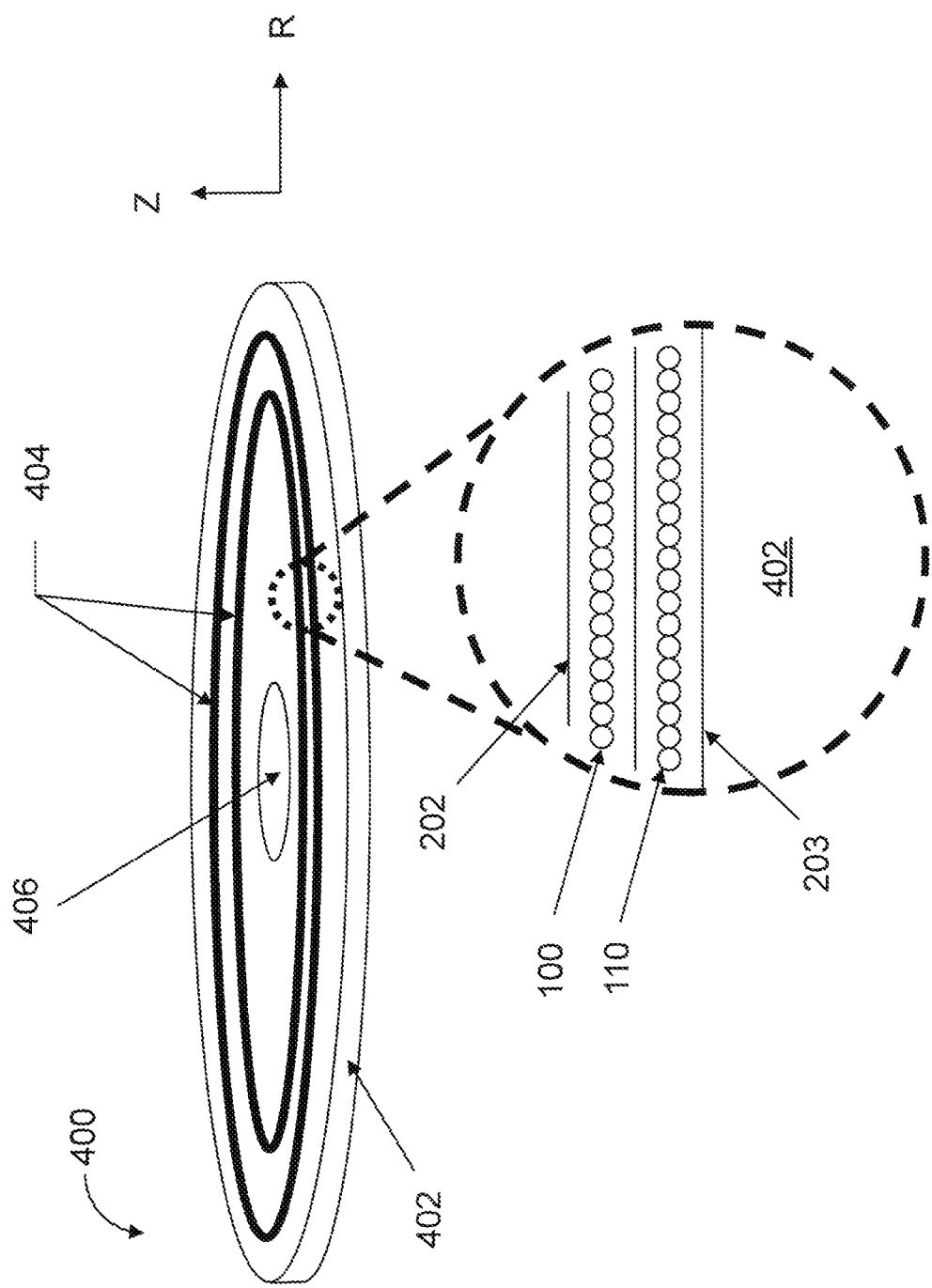
FIG. 5 – View of Disk with Concentric Rings

MAGNETIC STORAGE MEDIA INCLUDING NANOTUBES CONTAINING MAGNETIC NANOPARTICLES

CROSS-REFERENCES TO RELATED APPLICATIONS

This application is a continuation of U.S. patent application Ser. No. 14/171,699, filed Feb. 3, 2014, which is a continuation of U.S. patent application Ser. No. 12/700,738, filed Feb. 5, 2010, now U.S. Pat. No. 8,647,757, which is a continuation of U.S. patent application Ser. No. 11/278,879, filed Apr. 6, 2006, now U.S. Pat. No. 7,687,160, the disclosures of which are hereby incorporated by reference in their entirety.

BACKGROUND

The pursuit of higher performance computing systems is driving the reduction in scale of magnetic storage media. Higher storage densities allow for the reduction of device sizes, an enhancement of device capabilities, and a reduction in data storage costs. To facilitate this increase in magnetic data storage density, the industry is constantly searching for structures and processes to reduce the size of information storage sectors and tracks on magnetic tape and magnetic disks.

Current magnetic media technology is based upon the ability to polarize cells of magnetic materials that are deposited directly on a substrate material. These substrate materials are flexible, in the case of magnetic tape of floppy disks, or rigid, in the case of hard disks. Physics places an eventual limit on the ability to increase the storage density of media that is formed of magnetic particles deposited directly on such a storage tape or disk. In the near future, the magnetic storage media industry will reach this storage density limit. It is therefore essential to find new technologies to replace direct deposition of magnetic materials to facilitate further increases in magnetic storage media density.

SUMMARY

The present disclosure is a magnetic storage medium formed of magnetic nanoparticles that are encapsulated within carbon nanotubes, which are arranged on a substrate to facilitate the reading and writing of information by a read/write head. The substrate may be flexible or rigid. Information is stored on the magnetic nanoparticles via the read/write head of a storage device. These magnetic nanoparticles are arranged into data tracks to store information through encapsulation within the carbon nanotubes. As carbon nanotubes are bendable, the carbon nanotubes may be arranged on flexible or rigid substrates, such as a polymer tape or disk for flexible media, or a glass substrate for rigid disk. A polymer matrix may assist holding the nanoparticle-filled carbon tubes to the substrate.

The use of magnetic nanoparticles to store information facilitates a vast increase in the storage density capability of magnetic storage media. Encapsulation of these magnetic nanoparticles within carbon nanotubes allows for the organization of the magnetic nanoparticles into tracks and sectors of information storage media that a read/write head of a storage device can store information.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 1 depicts an isometric view of magnetic nanoparticles encapsulated within a carbon nanotube;

FIG. 2 depicts an isometric view of shunt nanoparticles encapsulated within a shunt carbon nanotube;

FIG. 3 depicts a cross section of a nano-scale magnetic medium having magnetic and shunt nanoparticles encapsulated within respective carbon nanotubes that are on a substrate;

FIG. 4 depicts a view of an arrangement of carbon nanotube data storage tracks on a magnetic tape; and FIG. 5 depicts a view of an arrangement of carbon nanotube data storage tracks on a disk.

DETAILED DESCRIPTION

FIG. 1 shows a magnetic carbon nanotube assembly 100 comprising a carbon nanotube 101. Carbon nanotube 101 is illustrated as a single-wall hollow tube formed of a single layer of carbon atoms in either hexagonal lattice pattern 102 or 112 (FIG. 2). Since carbon nanotube 101 is hollow, it can contain nanoparticles 103 and 104. Carbon nanoparticle 103 has a high magnetic coercivity so that it can permanently retain a first magnetic field until that field is changed to a second magnetic field. Also, nanoparticle 103 is a particle that does not oxidize or rust in ambient air, such as $CrO_2$ (chromium dioxide). Such oxidation would cause the loss of the stored magnetic field. Nanoparticle 104 also has a high magnetic coercivity, so that it can permanently retain a first magnetic field until that field is changed to a second magnetic field. Nanoparticle 104 contains high coercivity core 105 that holds the permanent magnetic field. To prevent oxidation, core 105 is encapsulated in shell 106. An example of core 105 is pure Fe (iron) and shell 106 is iron oxide, such as $Fe_2O_3$.

FIG. 2 shows shunt carbon nanotube assembly 110 comprising carbon nanotube 111. Like carbon nanotube 101, carbon nanotube 111 is illustrated as a single-wall hollow tube preferably formed of a single layer of carbon atoms in either hexagonal lattice pattern 112 or 102 (FIG. 1). Hexagonal lattice 112 is rotated 90° from hexagonal lattice 102 and suitable nanotubes comprising either lattice can be used. Since carbon nanotube 111 is hollow, it can contain nanoparticles 113 and 114. Carbon nanoparticle 113 has a low or zero magnetic coercivity so that it does not permanently retain a first magnetic field, which allows nanoparticle 113 to act as a magnetic shunt. Also, nanoparticle 113 is a particle that does not oxide or rust in ambient air, such as a soft-ferrite. Nanoparticle 114 also has low or zero coercivity, so that it does not permanently retain a first magnetic field. Nanoparticle 114 contains low or zero coercivity core 115 that provides the desired magnetic shunt. To prevent oxidation, core 115 is encapsulated in shell 116. An exemplary material for nanoparticle 114 is a soft-ferrite. Soft-ferrites, like other shunt materials, duct magnetic flux without retaining any "after field."

FIGS. 1 and 2 show the Z axis along the length of nanotubes 101 and 111. Nanotubes 101 and 111 can either be single-walled carbon nanotubes (SWNT) or multi-walled carbon nanotubes (MWNT). MWNTs may be formed with two, three, or more layers. The diameter D of nanotubes 101 and 111 is measured in nanometers. The diameter of the nanotubes, up to 12 nm, limits the size of nanoparticles 103, 104, 113, and 114. In addition to those materials already mentioned, exemplary materials for magnetic nanoparticles 103 and 104 or 113 and 114 include Cobalt (Co) and its alloys, Cobalt-ferrite, Cobalt-nitride, Cobalt-oxide (Co—O), Cobalt-palladium (Co—Pd), Cobalt-platinum (Co—Pt), Iron (Fe) and its alloys, Iron-gold (Fe—Au), Iron-chromium (Fe—Cr), Iron-nitride (Fe—N), Iron-oxide ($Fe_3O_4$), Iron-palladium (Fe—Pd), Iron-platinum (Fe—Pt), Fe—Zr—Nb—B, Manganese-nitride (Mn—N), Nd—Fe—B, Nd—Fe—B—Nb—Cu, Nickel (Ni) and its alloys, and soft-ferrites. These magnetic nanoparticles can be manufactured with sizes of 10 nm or less, such that these nanoparticles can fit within nanotubes 101 and 111. Examples of soft-ferrites include Mn—Zn, single crystal Mn—Zn, and Ni—Zn.

FIG. 3 shows magnetic storage medium 200. The T axis is along the thickness direction of magnetic storage medium 200. If magnetic medium 200 is magnetic tape, then the L axis is along the length of the tape and the W axis is along the width of the tape. Magnetic storage medium 200 comprises substrate 201, data recording layer 202, and optional shunt layer 203 in between substrate 210 and data recording layer 202. For magnetic tape and floppy disks, substrate 210 is typically polytetrafluoroethelyne (PTFE), which is commonly known by the trade name MYLAR™. For hard disks, substrate 201 can be aluminum, glass, or a stiff plastic, such as polycarbonate.

Data recording layer 202 comprises a plurality of magnetic carbon nanotube assemblies 100 that are embedded in a polymer matrix, such as HDPE 230 (High Density Polyethylene). Alternately, nanotube assemblies 100 are first encapsulated in HDPE and then embedded in a second polymeric matrix. Nanotubes 100 provide a home for nanoparticles 103 and 104, so they do not clump into large masses within the data recording layer.

Shunt layer 203 comprises a plurality of magnetic carbon nanotube assemblies 110 that are embedded in a matrix comprising HDPE 231. Alternately, nanotube assemblies 110 are first encapsulated in HDPE and then embedded in a second polymeric matrix. Nanotubes 110 provide a home for the shunt nanoparticles 113 and 114, so they do not clump into large masses within the shunt layer. Use of shunt layer 203 is optional, but it yields improved data recording when included in magnetic storage medium 200.

Magnetic recording head 210 comprises write element 212 mounted on a soft ferrite matrix 211. Write element 212 is essentially a U-shaped piece of low coercivity material and a wire coil, which forms an electro-magnet. That portion of write element 212 adjacent to magnetic storage medium 200 is open, to allow magnetic flux 213 to leave recording head 210 and penetrate magnetic storage medium 200 and imprint data in the form of ones and zeros based on the magnetic polarity of flux 213. Shunt layer 203 completes the magnetic circuit (analogous to completing an electrical circuit) and keeps flux 213 from "fringing" excessively. Shunt layer 203 permits more crisp edge transitions, thus permitting higher data densities on magnetic storage medium 200. Thus, data is stored in layer 202 with the assistance of shunt layer 203. Similarly, shunt layer 203 can assist in the reading of data. Write element 212 may further comprise a Metal-InGap (MIG) write head.

Data is read from magnetic storage medium 200, by means of a non-limiting example, via a magnetoresistive head or a spin-valve head that is alternately knows as a giant magnetoresistive "GMR" head.

The process for forming magnetic storage medium 200 is to first apply shunt layer 203 onto substrate 201. This may be done as a thin monolayer of nanotubes by running magnetic tape through a solution of HDPE 231 containing nanotubes 110. This may also be done as a thin monolayer of nanotubes 100 by spin coating a solution of HDPE 231 containing nanotubes 100 onto a magnetic disk. Multiple shunt mono layers can be layered on top of the first monolayer forming shunt layer 203 through repeating this process. To maximize dispersal of nanotubes 100 and 110, ethylene or another material that disperses carbon nanotubes may be used.

Once shunt layer 203 is cured, which may include supplemental heating or compression by rollers, data recording layer 202 is then added. This may be done as a thin monolayer of nanotubes by running magnetic tape through a solution of HDPE 230 containing nanotubes 100, and then curing the data layer 202. This may also be done as a thin monolayer of nanotubes 100 by spin coating a solution of HDPE 230 containing nanotubes 100 onto a disk, and then curing the data layer. Multiple data recording monolayers can be layered on top of the first monolayer forming data layer 202 through repeating this process. To maximize dispersal of nanotubes 100 and 110, ethylene, another material that disperses carbon nanotubes, may be used. Nanotubes 100 and 110 may be coated with an initial shell of HDPE before being added to HDPE 230 and 231.

FIG. 4 shows magnetic tape media 300 comprising substrate 301, magnetic datarecording layer 202, and shunt layer 203. The L axis is along the length of tape 300, the W axis is along the width of the tape, and the T axis is along the thickness of the tape. Tape media 300 has substrate 301 typically formed of polytetrafluoroethelyne (PTFE), which is commonly known by the trade name MYLAR™. Shunt layer 203 is formed on substrate 301. Shunt layer 203 is formed of a monolayer of shunt carbon nanotube assemblies 110. Assemblies 110 include carbon nanotubes 111 containing nanoparticles 113 and 114. Carbon nanoparticle 113 has a low or zero magnetic coercivity so that it does not permanently retain a first magnetic field, which allows nanoparticles 103 to act as a magnetic shunt. Data recording layer 202 is formed of a monolayer of carbon nanotube assemblies 100. Assemblies 100 include carbon nanotubes 101 that contain nanoparticles 103 and 104. Carbon nanoparticle 103 has a high magnetic coercivity so that it can permanently retain a first magnetic field until that field is changed to a second magnetic field, allowing for data storage. Carbon nanotubes 101 and 111 are oriented such that they are generally parallel to the lengthwise direction of tape media 300. Data tracks 303 are shown, from magnetic flux transitions recorded by magnetic head 210 in magnetic datarecording layer 202.

FIG. 5 shows magnetic disk 400 with monolayer rings 404 of layers 202 and 203 formed in layers about the center of disk 400. These layers may be further masked into individual rings 404. Rings 404 may be formed as distinct rings on disk 400 to form independent tracks. If disk 400 is a hard disk, substrate 402 can be aluminum, glass, or a stiff plastic, such as polycarbonate. If disk 400 is a floppy disk, substrate 402 is typically polytetrafluoroethelyne (PTFE), which is commonly known by the trade name MYLAR™. Z is the direction perpendicular to the disk and the R axis is the radial direction. Shunt layer 203 is formed of a monolayer of shunt carbon nanotube assemblies 110. Assemblies 110 include carbon nanotubes 111 containing nanoparticles 113 and 114. Carbon nanoparticle 113 has a low or zero magnetic coercivity so that it does not permanently retain a first magnetic field, which allows nanoparticle 113 to act as a magnetic shunt. Data recording layer 202 is formed of a monolayer of carbon nanotube assemblies 100. Assemblies 100 include carbon nanotubes 101 that contain nanoparticles 103 and 104. Carbon nanoparticle 103 has a high magnetic coercivity so that it can permanently retain a first magnetic field until that field is changed to a second magnetic field, allowing for data storage. Carbon nanotubes 101 and 111 may be oriented such that they extend radially from the center of disk 400. Alternatively, carbon nanotubes 101 and 111 may be oriented such that they extend in a spiral pattern from the center of the disk 400.

One method of forming rings 404 is through a photo-etching process. Layers 202 and 203 are first deposited onto disk 400 preferably through a spin coating process. A layer of photoresist material is then deposited on top of layers 202 and 203. This layer of photoresist is exposed through a mask, thereby patterning layers 202 and 203. A removal process leaves the patterned layers 202 and 203. While shown as rings 404, layers 202 and 203 may be patterned into any desirable track or sector pattern for data storage. Alternatively, when disk 400 is made of polycarbonate, rings 404 could be formed through a molding process. Recording layer 202 may further comprise buckyballs 299, which would act to reduce friction between the recording layer 202 and the magnetic head 210.

While the present disclosure has been shown and described with reference to a particular embodiment thereof, it will be understood to those skilled in the art, that various changes in form and details may be made therein without departing from the spirit and scope of the invention.

The invention claimed is:

1. A magnetic storage medium, comprising:
   a data layer including a plurality of nanotubes that contain a plurality of magnetic nanoparticles, wherein the plurality of nanotubes is encapsulated in a matrix.

2. The magnetic storage medium of claim 1, wherein the matrix comprises a polymer.

3. The magnetic storage medium of claim 1, wherein the plurality of magnetic nanoparticles is selected from the group consisting of cobalt (Co), cobalt-nitride (Co—N), cobalt-oxide (Co—O), cobalt-palladium (Co—Pd), cobalt-platinum (Co—Pt), iron (Fe), iron-gold (Fe—Au), iron-chromium (Fe—Cr), iron-nitride (Fe—N), iron-oxide (Fe3O4), iron-palladium (Fe—Pd), Fe—Zr—Nb—B, manganese-nitride (Mn—N), Nd—Fe—B, Nd—Fe—B—Nb—Cu, nickel (Ni), and combinations thereof.

4. The magnetic storage medium of claim 1, wherein the plurality of nanotubes is arranged in a monolayer.

5. The magnetic storage medium of claim 1, wherein the data layer comprises a data track formed from the plurality of nanotubes.

6. The magnetic storage medium of claim 5, wherein the data track has a configuration selected from the group consisting of a spiral configuration, a radial configuration, a concentric ring configuration, and a plurality of data sectors.

7. The magnetic storage medium of claim 1, wherein the plurality of magnetic nanoparticles comprises high-coercivity magnetic nanoparticles that can retain a first magnetic field until that field is changed to a second magnetic field.

8. The magnetic storage medium of claim 1, wherein the plurality of magnetic nanoparticles comprises magnetic nanoparticles including a high-coercivity core encapsulated within a shell, wherein the magnetic nanoparticles can retain a first magnetic field until that field is changed to a second magnetic field.

9. The magnetic storage medium of claim 1, wherein the plurality of nanotubes comprises carbon nanotubes.

10. The magnetic storage medium of claim 1, further comprising a substrate upon which the data layer is positioned.

11. The magnetic storage medium of claim 1, further comprising a shunt layer between a substrate and the data layer, wherein the shunt layer includes a plurality of shunt nanotubes that contain a shunt magnetic nanoparticle.

12. The magnetic storage medium of claim 11, wherein the shunt magnetic nanoparticle has low or near-zero coercivity.

13. The magnetic storage medium of claim 11, wherein the shunt magnetic nanoparticle comprises a material selected from the group consisting of Mn—Zn, single crystal Mn—Zn, and Ni—Zn.

14. A method of forming a magnetic storage medium, the method comprising:
   forming a data layer including a plurality of nanotubes that contain a plurality of magnetic nanoparticles, wherein the plurality of nanotubes is encapsulated in a matrix.

15. The method of claim 14, wherein the matrix comprises a polymer.

16. The method of claim 14, wherein the plurality of magnetic nanoparticles is selected from the group consisting of cobalt (Co), cobalt-nitride (Co—N), cobalt-oxide (Co—O), cobalt-palladium (Co—Pd), cobalt-platinum (Co—Pt), iron (Fe), iron-gold (Fe—Au), iron-chromium (Fe—Cr), iron-nitride (Fe—N), iron-oxide (Fe3O4), iron-palladium (Fe—Pd), Fe—Zr—Nb—B, manganese-nitride (Mn—N), Nd—Fe—B, Nd—Fe—B—Nb—Cu, nickel (Ni), and combinations thereof.

17. The method of claim 14, wherein said forming a data layer comprises arranging the plurality of nanotubes in a monolayer.

18. The method of claim 14, wherein said forming a data layer comprises arranging the plurality of nanotubes in a data track.

19. The method of claim 18, wherein the data track has a configuration selected from the group consisting of a spiral configuration, a radial configuration, a concentric ring configuration, and a plurality of data sectors.

20. The method of claim 14, wherein the plurality of magnetic nanoparticles comprises high-coercivity magnetic nanoparticles that can retain a first magnetic field until that field is changed to a second magnetic field.

21. The method of claim 14, wherein the plurality of magnetic nanoparticles comprises magnetic nanoparticles including a high-coercivity core encapsulated within a shell, wherein the magnetic nanoparticles can retain a first magnetic field until that field is changed to a second magnetic field.

22. The method of claim 14, wherein the plurality of nanotubes comprises carbon nanotubes.

23. The method of claim 14, wherein said forming a data layer comprises forming the data layer on a substrate.

24. The method of claim 14, further comprising:
   forming a shunt layer on a substrate, wherein the shunt layer includes a plurality of shunt nanotubes that comprise a shunt magnetic nanoparticle, and wherein the data layer is on the shunt layer.

25. The method of claim 24, wherein the shunt magnetic nanoparticle has near-zero coercivity.

26. The method of claim 24, wherein the shunt magnetic nanoparticle comprises a material selected from the group consisting of Mn—Zn, single crystal Mn—Zn, and Ni—Zn.

* * * * *